(12) United States Patent
Kim et al.

(10) Patent No.: US 9,154,786 B2
(45) Date of Patent: Oct. 6, 2015

(54) APPARATUS OF PREDICTIVE CODING/DECODING USING VIEW-TEMPORAL REFERENCE PICTURE BUFFERS AND METHOD USING THE SAME

(71) Applicant: ELECTRONICS AND TELECOMMUNICATIONS RESEARCH INSTITUTE, Daejeon (KR)

(72) Inventors: Dae-Hee Kim, Daejon (KR); Nam-Ho Hur, Daejon (KR); Soo-In Lee, Daejon (KR); Yung-Lyul Lee, Seoul (KR); Jong-Ryul Kim, Seoul (KR); Suk-Hee Cho, Daejon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 192 days.

(21) Appl. No.: 13/729,556

(22) Filed: Dec. 28, 2012

(65) Prior Publication Data

US 2013/0114699 A1 May 9, 2013

Related U.S. Application Data

(63) Continuation of application No. 11/996,045, filed as application No. PCT/KR2006/002804 on Jul. 18, 2006, now Pat. No. 8,369,406.

(30) Foreign Application Priority Data

Jul. 18, 2005 (KR) .................. 10-2005-0064992

(51) Int. Cl.
*H04N 19/50* (2014.01)
*H04N 19/597* (2014.01)
(Continued)

(52) U.S. Cl.
CPC ....... *H04N 19/00569* (2013.01); *H04N 19/114* (2014.11); *H04N 19/136* (2014.11);
(Continued)

(58) Field of Classification Search
USPC ................. 375/240.03, 240.16; 348/211-218
See application file for complete search history.

(56) References Cited

U.S. PATENT DOCUMENTS 5,617,334 A 4/1997 Tseng et al.
(Continued)

FOREIGN PATENT DOCUMENTS

| CN | 1450816 A | 10/2003 |
|---|---|---|
| JP | 09-261653 A | 10/1997 |

(Continued)

OTHER PUBLICATIONS

"Advanced video coding for generic audiovisual services; H.264 (May 2003)", ITU-T Standard Superseded (S), International Telecommunication Union, Geneva, CH No. H.264 (May 2003), May 30, 2003, pp. 110-123, XP002580786, paragraph [8.4.1.3].
(Continued)

*Primary Examiner* — Man Phan
(74) *Attorney, Agent, or Firm* — Ladas & Parry LLP

(57) ABSTRACT

Provided are an apparatus and method for predictive coding/decoding for improving a compression rate of multiview video using one or two additional reference frame buffers. The predictive encoding apparatus includes: a multiview reference picture providing unit for providing a reference picture for a predictive encoding according to temporal and spatial GOP structure information; a prediction unit for creating a vector by predicting which part of the reference picture inputted from the multiview reference picture providing unit is referred by a picture to currently encode; a transforming and quantizing unit for obtaining a difference signal between the predicted signal inputted from the prediction unit and a picture signal to currently encode, transforming the obtained difference signal, quantizing the transformed signal, and compressing the quantized signal; and an entropy encoding unit for encoding the quantized signal and the vectors according to a predetermined scheme and outputting the encoded signal.

4 Claims, 3 Drawing Sheets

(51) Int. Cl.

| | |
|---|---|
| *H04N 19/52* | (2014.01) |
| *H04N 19/61* | (2014.01) |
| *H04N 19/60* | (2014.01) |
| *H04N 19/114* | (2014.01) |
| *H04N 19/136* | (2014.01) |
| *H04N 19/527* | (2014.01) |
| *H04N 19/94* | (2014.01) |
| *H04N 19/58* | (2014.01) |

(52) U.S. Cl.
CPC .............. *H04N 19/50* (2014.11); *H04N 19/52* (2014.11); *H04N 19/527* (2014.11); *H04N 19/58* (2014.11); *H04N 19/597* (2014.11); *H04N 19/60* (2014.11); *H04N 19/61* (2014.11); *H04N 19/94* (2014.11)

(56) References Cited

U.S. PATENT DOCUMENTS

| | | | | |
|---|---|---|---|---|
| 6,055,012 | A * | 4/2000 | Haskell et al. | 348/48 |
| 6,192,077 | B1 * | 2/2001 | Sugiyama | 375/240.12 |
| 6,430,224 | B1 | 8/2002 | Naito et al. | |
| 6,532,306 | B1 * | 3/2003 | Boon et al. | 382/232 |
| 6,608,622 | B1 | 8/2003 | Katayama et al. | |
| 6,996,280 | B1 * | 2/2006 | Matsukawa et al. | 382/236 |
| 7,468,745 | B2 * | 12/2008 | Xin et al. | 348/218.1 |
| 7,675,971 | B2 * | 3/2010 | Ando | 375/240.03 |
| 7,773,671 | B2 | 8/2010 | Malvar | |
| 7,944,444 | B2 * | 5/2011 | Ha et al. | 345/427 |
| 2003/0202592 | A1 | 10/2003 | Sohn et al. | |
| 2004/0120396 | A1 | 6/2004 | Yun et al. | |
| 2005/0053139 | A1 * | 3/2005 | Park | 375/240.16 |
| 2005/0213830 | A1 | 9/2005 | Nagashima | |
| 2005/0226335 | A1 | 10/2005 | Lee et al. | |
| 2005/0243931 | A1 | 11/2005 | Yasuda et al. | |
| 2005/0276500 | A1 | 12/2005 | Nakayama et al. | |
| 2006/0171456 | A1 | 8/2006 | Kwon | |
| 2006/0198439 | A1 * | 9/2006 | Zhu | 375/240.03 |
| 2006/0256866 | A1 * | 11/2006 | Ziauddin et al. | 375/240.15 |
| 2007/0189396 | A1 | 8/2007 | Kitahara et al. | |
| 2009/0028241 | A1 * | 1/2009 | Takahashi et al. | 375/240.12 |

FOREIGN PATENT DOCUMENTS

| | | |
|---|---|---|
| JP | 09-275578 A | 10/1997 |
| JP | 11-252586 A | 9/1999 |
| JP | 2000-023198 A | 1/2000 |
| JP | 2001-285895 A | 10/2001 |
| JP | 2004-159132 A | 6/2004 |
| KR | 10-0331050 B1 | 3/2002 |
| KR | 1020030083285 A | 10/2003 |
| KR | 1020040065014 A | 7/2004 |
| WO | 2006/073116 A1 | 7/2006 |

OTHER PUBLICATIONS

Hideaki Kimata, et al; "Multi-view Video Coding Using Reference Picture Selection for Free Viewpoint Video Communication", 24. Picture Coding Symposium; Dec. 15-17, 2004; San Francisco, Dec. 15, 2004; XP030080188 the whole document.

Hideaki Kimata; "Movement on MPEG 3DAV toward International Standardization of 3D Video", IPSJ SIG Technical Reports, vol. 2005; No. 23(AVM-48); p. 49-54.

W. Yang, et al; "An MPEG-4-Compatible Stereoscopic/Multiview Video Coding Scheme", IEEE Transactions on Circuits and Systems for Video Technology, vol. 16, No. 2, pp. 286-290, Feb. 2006.

Jeongeun Lim, et al; "Multiview Video Sequence CODEC with View Scalability", Paper of The Korean Society of Broadcast Engineers, vol. 9, No. 3, pp. 236-245, Sep. 2004.

Yongtae Kim, et al; "Edge-Directional Joint Disparity-Motion Estimation of Stereoscopic Sequences", Paper of The Korean Society of Broadcast Engineers, vol. 9, No. 3, pp. 196-206, Sep. 2004.

Wenxian Yang, et al; "MPEG-4 based Stereoscopic and Multiview Video Coding", Proceedings of 2004 International Symposium on Intelligent Multimedia, Video and Speech Processing, pp. 61-64, Oct. 2004.

"Encoding and Reconstruction of Multiview Video Objects", IEEE Signal Processing Magazine, vol. 16, Issue 3, pp. 47-54, May 1999.

Supplementary European Search Report; EP06783325, Oct. 27, 2006.

International Search Report mailed Oct. 27, 2006; PCT/KR2006/002804.

USPTO NFOA mailed Oct. 12, 2011 in connection with U.S. Appl. No. 11/996,045.

USPTO NOA mailed Feb. 16, 2012 in connection with U.S. Appl. No. 11/996,045.

USPTO NOA mailed Oct. 2, 2012 in connection with U.S. Appl. No. 11/996,045.

M. Droese, et al; "Ray-Space Interpolation constraining Smooth Disparities based on Loopy Belief Propagation", Proceedings of 11th International Workshop on Systems, (Proceedings of 11th International Workshop on Systems, Signals and Image Processing. Ambient Multimedia; Poznan, Poland, Sep. 13-15, 2004, pp. 247-250.

Yongtae Kim, et al; "Efficient disparity vector coding for multiview sequences", Signal Processing. Image Communication, Elsevier Science Publishers, Amsterdam, NL, vol. 19, No. 6, Jul. 1, 2004, pp. 539-553, ISSN: 0923-5965, 001: 10.1 016/J .IMAGE.2004.04.004

Masayuki Tanimoto, et al; "Response to Call for Evidence on Multi-View Video Coding", 71.MPEG Meeting; Jan. 17, 2005-Jan. 21, 2005; Hong Kong;(Motion Ictureexpert Group or ISO/IEC JTC11 SC29/WG11), No. M11762, Jan. 17, 2005; ISN: 0000-0250; 6 pages.

XP030013629; "Survey of Algorithms used for Multi-view Video Coding (MVC)", 71. MPEG Meeting; Jan. 17, 2005-Jan. 21, 2005; Hong Kong;(Motion Pictureexpert Group or ISO/IEC JTC1/SC29/WG11), No. 6909, Jan. 21, 2005; ISSN: 0000-0349.

* cited by examiner

APPARATUS OF PREDICTIVE CODING/DECODING USING VIEW-TEMPORAL REFERENCE PICTURE BUFFERS AND METHOD USING THE SAME

TECHNICAL FIELD

The present invention relates to an apparatus and method for coding and decoding a multiview video; and more particularly, to an apparatus and method for predictive coding/decoding for improving a compression rate of multiview video using one or two additional reference frame buffers.

BACKGROUND ART

In order to provide realistic video services, a multiview video has been used in various application fields. Such a multiview video is compressed, and the compressed multiview video is transmitted to a user for providing related service. Although the multiview video is compressed according to a conventional coding and compressing scheme, it requires a large quantity of data as large as two times of the number viewpoints to be transmitted to a user. Accordingly, a wide bandwidth is required to provide a related service for the multiview video.

In order to effectively transmit the multiview video data, a compression rate is improved using the redundant information of an adjacent camera viewpoint and a current viewpoint. The compression rate is generally improved by removing the redundant information from a set of data having high correlation, transforming it to data without correlation and coding the transformed data. Conventional AVC based multiview coding uses only a temporal reference picture buffer in predictive coding between viewpoints. That is, the conventional AVC based multiview coding restrictively consider the efficiency of the predictive coding between viewpoints. Therefore, it requires the efficiency of the predictive coding to be improved.

As conventional technologies for encoding a plurality of pictures, a method for processing a stereoscopic video regarding to two viewpoints was introduced. Also, as a method for processing multiview video based on more than three viewpoints, a method of processing a multiview video regarding to a multiple lens reflex solid, and a method of processing a multiview video obtained from cameras arranged adjacently were introduced. A technology for encoding using a MPEG-2 multiview profile (MVP) and a MPEG-4 temporal scalability (TS) was widely used to encode stereoscopic video.

A technology of encoding using the MPEG-2 MVP and the MPEG-4 TS was introduced in Korea Patent Application No. 10-2002-0021757, and Korea Patent Application No. 10-2003-0002116. Also, such a technology was introduced in an article by Kwang-Hoon Son, entitled "multiview video CODEC using view scalability", and another article by Yong-Tae Kim, entitled "method for estimating motion and variation in stereoscopic video with boundary directivity".

In Korea Patent Application No. 10-2002-0021757 and the article of Son, a group of picture (GOP) was commonly proposed. Also, the Korea Patent Application No. 10-2002-0021757 uses a MPEG-2 based CODEC. The Korea Patent Application No. 10-2002-0021757 focus on compression, and the article of Kim focus on adding scalability in a unit of view using a MPEG-2 based CODEC.

The Korea Patent Application No. 10-2003-0002116 creates a bit stream of a central viewpoint, and the created reference picture of the central viewpoint is used to create a bit stream of left/right viewpoint picture. In Kim's article, a method of increasing a compression rate by minimizing the error of predicting spatial and temporal disparity in a stereo video.

Excepting Korea Patent Application 10-2003-0002116, the above described conventional technologies use single predicted motion vector when a P-picture is encoded because of the comparability with MPEG-2. Since two vectors are used for encoding a B-picture, a motion vector from a previous frame and a disparity vector from an adjacent viewpoint in a current time are used. Korea Patent Application 10-2003-002116 uses one motion vector and one disparity vector to refer the central viewpoint picture. In case of B-picture, vectors are used as like typical MPEG-2, and no B-picture is present on a time axis in a left/right viewpoint.

These conventional technologies do not use more that two motion vectors or disparity vectors due to the comparability with MPEG-2. When the B-picture of MPEG-2 is encoded, bi-directional predictive coding on time axis cannot be performed. Furthermore, the distance between viewpoints, and the size of a base line is regarded by extending the number of viewpoints when the I-picture is encoded. It is not proper disparity vector prediction method. It requires a step for transforming an adjacent viewpoint to a current viewpoint.

Also, the compression rate is decreased because the disparity vector and the motion vector are encoded with a same scheme although they fundamentally are different. That is, the size of the disparity vector is generally larger than the motion vector. When a motion vector is selected at a previous block and a disparity vector is selected at a following block, the difference of vectors is not effective in a view of characteristic of encoder that performs entropy-coding on the vector difference. Furthermore, a context reflected affection cannot be obtained when performing the context adaptive entropy-coding as like AVG.

DISCLOSURE

Technical Problem

It is, therefore, an object of the present invention to provide an apparatus and method for predictive coding/decoding using additional view-temporal reference picture buffers as well as a List-0 and a List-1 buffer used in H.264 to make the most of the characteristics of motion vector and disparity vector when encoding a multiview video.

It is another object of the present invention to provide various multiview video services through a method of encoding multiview video by reducing the data amount of a single view encoder through effectively removing redundancy information of viewpoints.

Technical Solution

In accordance with one aspect of the present invention, there is provided a predictive encoding apparatus using a view-temporal reference picture buffer, including: a multiview reference picture providing unit for providing a reference picture for a predictive encoding according to temporal and spatial group of picture (GOP) structure information; a prediction unit for creating a vector by predicting which part of the reference picture inputted from the multiview reference picture providing unit is referred by a picture to currently encode; a transforming and quantizing unit for obtaining a difference signal between the predicted signal inputted from the prediction unit and a picture signal to currently encode, transforming the obtained difference signal, quantizing the transformed signal, and compressing the quantized signal;

and an entropy encoding unit for encoding the quantized signal from the transforming and quantizing unit and the vectors provided from the prediction unit according to a pre-determined scheme, and outputting the encoded signal.

In accordance with another aspect of the present invention, there is provided a method of predictive encoding using a view-temporal reference picture buffer including the steps of: a) providing a reference picture for predictive coding according to temporal and spatial GOP structure information; b) creating vectors using the provided reference picture and predicting a picture to currently encode; c) transforming a predicted signal, quantizing the transformed signal, and compressing the quantized signal; and d) encoding the quantized signal and the vector provided for the prediction unit according to a predetermined encoding scheme and outputting the compressed signal.

In accordance with still another aspect of the present invention, there is provided an apparatus for decoding a signal created by encoding a multiview picture obtained from a plurality of cameras, the apparatus including: a decoding unit for decoding a signal inputted from the outside through entropy-decoding, inverse rearranging, inverse-quantizing, and inverse transforming; a temporal and spatial GOP based picture restoring unit for restoring the multiview picture from the decoded signal inputted from the decoding unit using temporal and spatial GOP configuration information which expresses a reference relation between pictures temporally and spatially for predictive encoding; and a scene compositing unit for compositing multiview pictures restored from the temporal and spatial GOP based picture restoring unit, and outputting the composite multiview pictures, wherein the entropy-decoding uses a motion vector and a disparity vector.

In accordance with further still another aspect of the present invention, there is provided a decoding method including the steps of: a) decoding a signal inputted from the outside through entropy-decoding, inverse-rearranging, inverse-quantizing, and inverse transforming; b) restoring the multiview picture from the decoded signal using temporal and spatial GOP configuration information which expresses a reference relation between pictures temporally and spatially for predictive encoding; and c) compositing the restored multiview pictures and outputting the composite multiview pictures, wherein entropy-decoding uses a motion vector and a disparity vector.

Advantageous Effects

The present invention relates to an apparatus and method for effectively performing view-to-view predictive encoding, which allows multiview video service that obtains, compresses, transmits, recovers and display multiview video. Therefore, it can be used for 3-D display service, omhni video service, panoramic video service and free viewpoint TV service. Also, the compress rate can be improved using information adjacent viewpoint when encoding multiview video.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
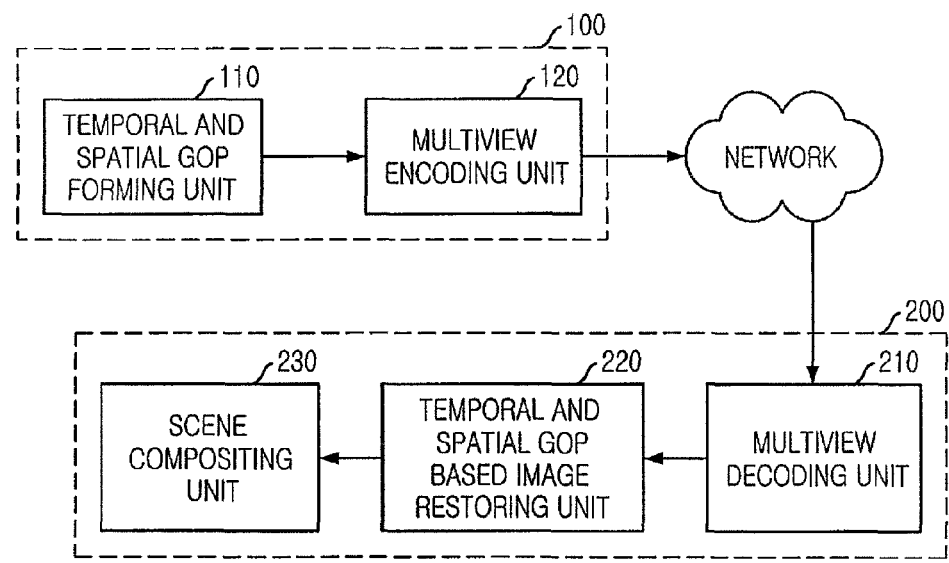
FIG. 1 is a block diagram illustrating a multiview video encoding/decoding system in accordance with an embodiment of the present invention.

FIG. 1 is a block diagram illustrating a multiview video encoding/decoding system in accordance with an embodiment of the present invention.

Referring to FIG. 1, the multiview video encoding/decoding system according to the present embodiment includes a multiview video encoding apparatus 100 for coding and compressing multiview video made of N viewpoint pictures obtained from N cameras and transmitting the compressed multiview video as a bit stream, and a multiview video decoding apparatus 200 for receiving the bit stream, decoding and compositing the received bit stream to restore the multiview video.

The multiview encoding apparatus 100 includes a temporal and spatial group of picture (GOP) forming unit 110 and a multiview encoding unit 120.

The temporal and spatial GOP forming unit 110 receives N multiview pictures from a plurality of N cameras or a user, and camera information that includes the characteristics, locations and arrangement of N viewpoint cameras. Based on the received N multiview pictures and the camera information, the temporal and spatial GOP forming unit 110 creates temporal and spatial GOP information and outputs the created temporal and spatial GOP information.

The multiview encoding unit 120 performs predictive-coding on the multiview pictures using the temporal and spatial GOP information and the camera information.

The multiview video decoding apparatus 200 includes a multiview decoding unit 610, a temporal and spatial GOP based picture restoring unit 220 and a scene compositing unit 230. The multiview decoding unit 610 receives the bit stream and decodes the received bit stream. The temporal and spatial GOP based picture restoring unit 220 restores multiview video using the temporal and spatial GOP information, and the scene compositing unit 230 appropriately composites restored multiview video according to related application and provides the composite multiview video a user.

Hereinafter, the operation of the multiview video decoding apparatus according to the present invention will be described.

The multiview decoding unit 210 processes the received bit stream through entropy-decoding, inverse-rearranging, inverse-quantizing, and inverse-transforming. The temporal and spatial GOP based picture restoring unit 220 restores the multiview pictures from the inverse-transformed signal using the temporal and spatial GOP information included in the bit stream. The scene compositing unit 230 composites the restored multiview pictures.

Also, the temporal and spatial GOP based picture restoring unit 220 performs motion-compensation according to the temporal and spatial GOP information when the viewpoint of the currently-decoding picture is identical to that of a reference picture, and performs disparity/motion compensation when the viewpoint of the currently-decoding picture is identical to that of a picture adjacent to a reference picture.

Figure 2:
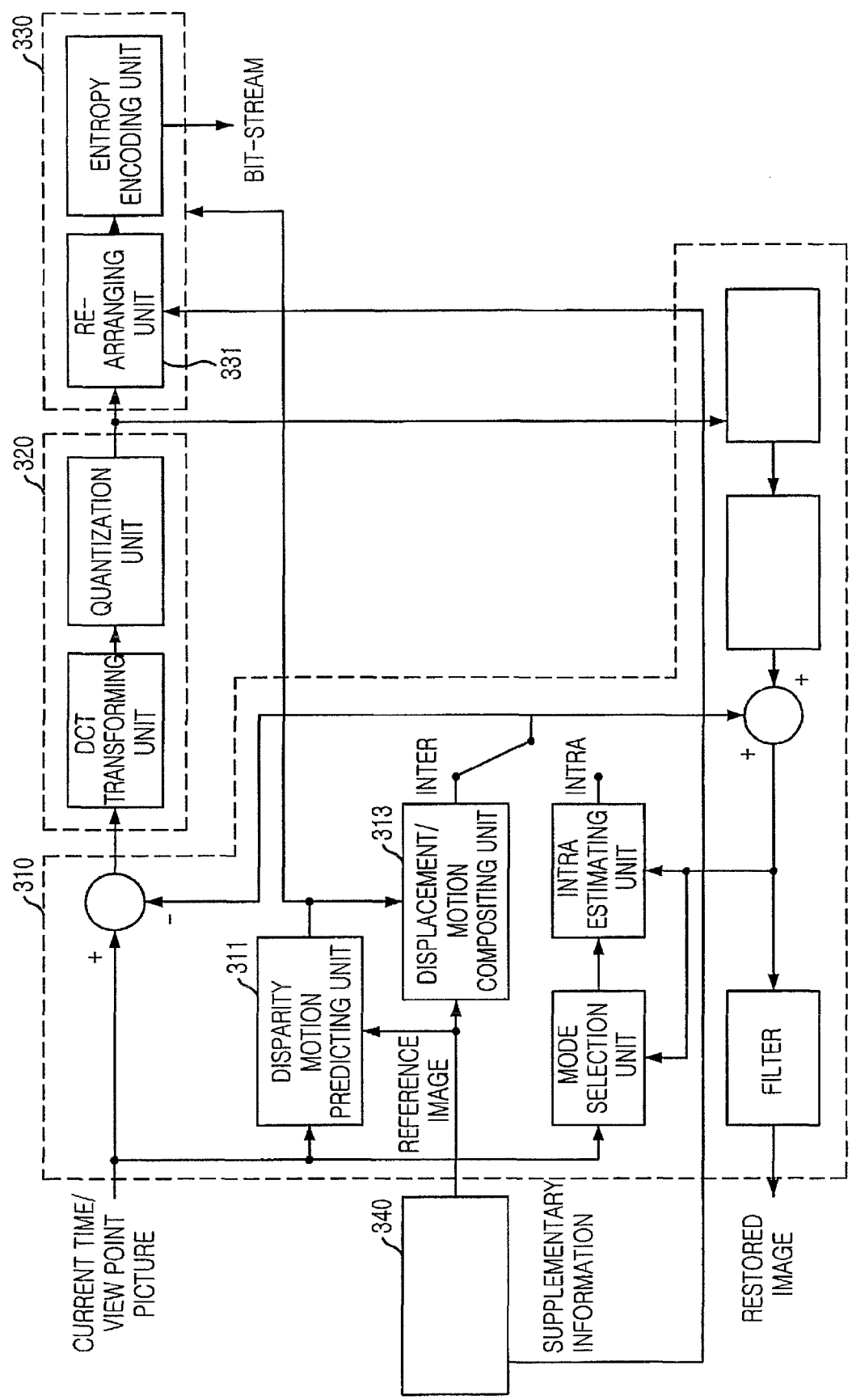
FIG. 2 is a block diagram illustrating a reference video buffer for temporal predictive encoding and a reference video buffer for spatial predictive encoding in accordance with an embodiment of the present invention.

FIG. 2 is a block diagram illustrating a multiview video encoding apparatus including a reference picture buffer for temporal predictive coding and a reference picture buffer for spatial predictive coding in accordance with an embodiment of the present invention.

As shown in FIG. 2, the multiview encoding unit includes a multiview reference picture providing unit 340, a prediction unit 310, a transforming and quantizing unit 320 and an entropy encoding unit 330.

The prediction unit 310, the transforming and quantizing unit 320 and the entropy encoding unit 330 perform operations identical to those of H.264. That is, the prediction unit 310 performs an inter prediction and an intra prediction. The inter prediction predicts the block of a current picture using reference pictures stored in a buffer after decoding and de-blocking filtering. That is, the inter prediction finds a block that is most similar to the block to encode from the reference pictures. The intra prediction finds a block that is most similar to the current block to encode from the blocks of the decoded same picture.

The transforming and quantizing unit 320 compresses a difference signal between the predicted block from the prediction unit 310 and a block to encode after transforming and quantizing the difference signal. The entropy coding unit 330 creates a H.264 based bit stream by encoding the quantized video data based on a predetermined coding scheme.

The disparity/motion predicting unit 311 and the disparity/motion compensating unit 313 are operated as a motion predicting and motion compensating unit when the viewpoint of the inputted reference picture is identical to that of a current picture to encode. The disparity/motion predicting unit 311 transfers a motion vector (MV) and a disparity vector (DV) to the entropy coding unit 330, and the entropy coding unit 330 performs entropy-coding on the motion vector and the disparity vector.

The multiview reference picture providing unit 340 inverse-quantizes and inverse-transforms the quantized picture from the converting and quantizing unit 320 to create the multiview restored picture, and stores the multiview restored picture. Also, the multiview reference picture providing unit 340 receives the restored multiview pictures, which is inverse-quantized and inverse-transformed for predictive coding after transforming and quantizing the picture signal by the transforming and quantizing unit 320, and stores the received multiview pictures. Also, the multiview reference picture providing unit 340 selects a reference picture according to the GOP structure information from the temporal and spatial GOP forming unit 310 and provides the selected reference picture to the disparity/motion compensating unit and the disparity/motion predicting unit. Accordingly, the predictive coding can be performed according to the reference relation of multiview pictures that are expressed in the GOP structure information. Furthermore, the multiview reference picture providing unit 340 provides supplementary information including the temporal and spatial GOP structure information to a rearranging unit 331, and performs entropy-coding on the current predictive coded picture information with the temporal and spatial GOP structure information and transmits the entropy-encoded information in order to use the temporal and spatial GOP structure information while decoding.

Figure 3:
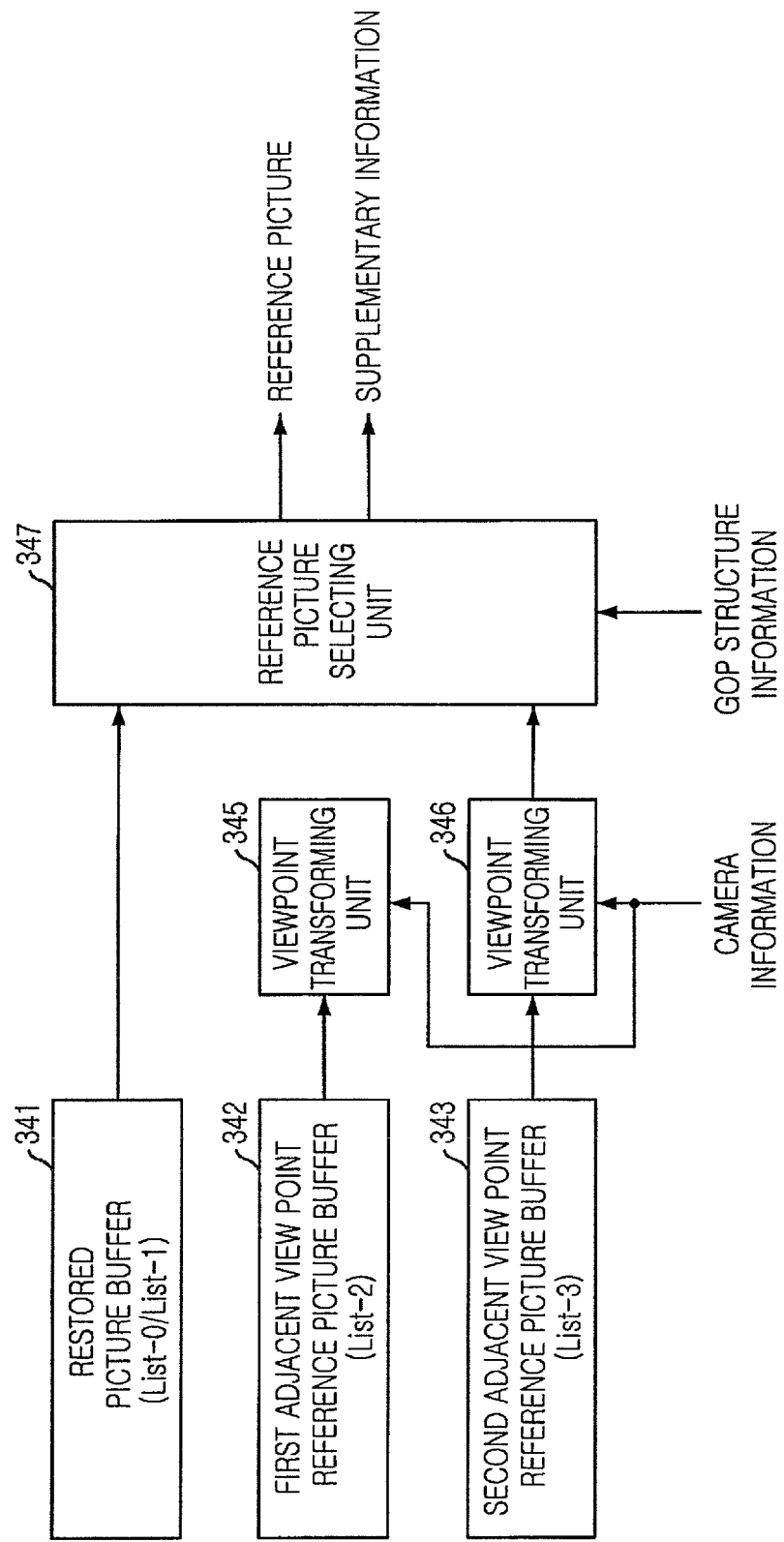
FIG. 3 is a block diagram illustrating a multiview reference video providing unit shown in FIG. 2.

FIG. 3 is a block diagram illustrating a multiview reference video providing unit shown in FIG. 2.

Referring to FIG. 3, the multiview reference picture providing unit 340 includes a restored picture buffer 341, a first adjacent view reference picture buffer 342, a second adjacent view reference picture buffer 343, viewpoint transforming units 345 and 346, and a reference picture selecting unit 347.

The restored picture buffer 341 receives the restored pictures of a current viewpoint and a different time from a filter and temporary stores the received pictures. The restored picture buffer 341 outputs the stored picture to the reference picture selecting unit 347.

The first adjacent reference picture buffer 342 (List-2) receives restored pictures, which were restored after encoded at the other time of a current time, from a filter and temporary stores the received pictures as a reference picture. The second adjacent reference picture buffer (List-3) 343 receives restored pictures, which were restored after encoded at other viewpoint with a future time and another restored pictures, which were restored after encoded at other viewpoint with a past time, from a filter and temporary stores the received pictures as a reference picture. Then, the second adjacent reference picture buffer 343 outputs the stored picture to the viewpoint transforming unit 346.

The viewpoint transforming units 345 and 346 transforms pictures through color balance with a current camera viewpoint, global motion compensation to a current viewpoint picture and rectification using the previously inputted camera information in order to use a proper reference picture compared to an adjacent viewpoint picture inputted from the first and second adjacent viewpoint reference picture buffers 342 and 343.

The reference picture selecting unit 347 selects a reference picture among inputted reference pictures for current predictive coding according to temporal and spatial GOP structure information inputted from the temporal and spatial GOP forming unit 110. The selected reference picture is outputted to the disparity/motion predicting unit 311 and the disparity/motion compensating unit 313. Also, the reference picture selecting unit 347 creates supplementary information including the GOP structure information and outputs the created supplementary information to a rearranging unit 331.

The buffers, List-0/List-1 341, List-2 342 and List-3 343 shown in FIG. 3 are present independently to every viewpoint and managed independently to each of the viewpoints.

The disparity vector denotes not only a distance between pictures of other viewpoints at a same time but also a distance between pictures of same viewpoints at different time. That is, a distance between a current picture of a current viewpoint and a picture of different viewpoint at same time is disparity, and a distance between a preceded picture and a following picture in a picture of different viewpoint from the picture of a current viewpoint is also disparity. Pictures for calculating the disparity vector are managed by the List-2 342 and the List-3 343.

Since the sizes of the motion vector and the disparity vector are different as described above, a conventional multiview video encoder that select one of the motion vector and the disparity vector may lost the advantage of context adaptive entropy coding such as CABAC when the vector characteristics of consecutive blocks are different and when the difference between a current vector and a previous vector is coded and transmitted in a block based vector coding.

Hereinafter, a method of encoding the disparity vector obtained from different viewpoint pictures for overcoming such a problem according to the present embodiment will be described.

As a first method of encoding the disparity vector according to the present embodiment, the disparity vector and the motion vector are separated for each block and separately encoded as context adaptive. As a second method, overall disparity between pictures of different viewpoints is compensated, and the predictive-coding is performed on the motion vector by regarding the disparity vector as the motion vector.

As a third method, the List-0 341 and the List-2 342 are combined as one buffer, and the List-1 341 and the List-3 343 are combined as one buffer. Then, the predictive-coding is performed by distinguishing the combined buffers as a time axis buffer or a viewpoint buffer.

In the first method, if the viewpoint of an inputted picture is a base viewpoint, a motion vector is only used as like a conventional single viewpoint video encoder. In case of pictures in other viewpoints, one of a motion vector and a disparity vector, or the combination of the motion vector and disparity vector is used. Herein, the range of using vectors is decoded by the type of each block, for example, a MB type. For the disparity vector, the List-2 342 and the List-3 343 are selected as the reference picture buffer, and the List-0 and the List-1 buffer 341 are selected as a reference picture buffer for the motion vector.

The entropy encoding unit 330 creates look-up tables for the disparity vector and the motion vector and encodes the disparity vector and the motion vector as context adaptive in order to separate the disparity vector and the motion vector and encode the separated vectors. Since the vectors are encoded after separating the disparity vector and the motion vector, the problems arisen in the entropy-encoding is removed, and the coding efficiency is improved using a plurality of vectors as like B-picture that is the bi-directional predictive encoding picture of a signal viewpoint video encoding scheme. That is, in the first method, the motion vector or the disparity vector is obtained using two reference pictures on a time axis from List-0 and List 1 and other two reference pictures on a viewpoint from a List-2 and a List-3, and the disparity vector and the motion vector are separated and encoded for each block by creating the look-up tables for each of the obtained motion vector and disparity vector.

In the second method of encoding the disparity vector, a motion vector is only used if an inputted picture is a base viewpoint as like the conventional single viewpoint video encoder. For pictures with other viewpoint, a predictive coding is performed by regarding the motion vector and the disparity vector as a same vector. Herein, in order to overcome the problem of the entropy-coding, the overall disparity vector is compensated, and the difference thereof is coded because the vector obtained from the List-2 342 or the List-3 343 is the disparity vector. That is, the characteristic difference between the motion vector and the disparity vector is compensated through compensating the overall disparity vector so as to overcome the problem of the entropy encoding.

The motion vector and the disparity vector are encoded as like a following equation.

$$VD = MV - PMV, \quad \text{When } MV \text{ is encoded using } PMV \quad \text{Eq. 1}$$

$$\begin{cases} VD = DV - GDV - PMV, & \text{When } DV \text{ is encoded using } PMV \\ VD = MV + GDV - PDV, & \text{When } MV \text{ is encoded using } PDV \\ VD = DV - PDV, & \text{When } DV \text{ is encoded using } PDV \end{cases}$$

In Eq. 1, MV denotes a motion vector, DV denotes a disparity vector, PMV represents a predicted motion vector obtained from adjacent blocks, PDV is a predicted disparity vector obtained from adjacent block, and GDV denotes an overall disparity vector generated from a distance between pictures with different viewpoints. The GDV can be obtained using an overall motion vector predicting method or a camera parameter. Also, the VD is a vector difference to encode.

In the second method, the entropy encoding unit 30 encodes the disparity vector as like the first case in Eq. 1 if a predicted value obtained from adjacent blocks is the predicted motion vector and the MV is a vector to encode. Also, the entropy encoding unit 30 encodes the disparity vector as like the fourth case in Eq. 1 if the predictive value is PDV and the DV is a vector to encode. Furthermore, the entropy encoding unit 30 encodes the disparity vector using a value obtained by subtracting GDV and PMV from DV as a vector difference as shown in second case, if the predicted value obtained from adjacent block is PMV and a DV is a vector to encode. Lastly, if the PDV is obtained from adjacent blocks and a current MV is encoded, the entropy encoding unit 30 encodes the vector difference obtained by subtracting PDV from the adding of MV and GDV. As shown, maximally four vectors can be used.

The third method uses two buffers as like the H.264 buffer management scheme by composing a view-to-view buffer and a time axis buffer. In this case, maximally two vectors can be obtained from the List-0/List-2 buffer and the List-1/List-3 buffer. And, according to the index of the buffer, the disparity vector and the motion vector can be distinguished. Herein, the motion vector and the disparity vector are differentially coded using PMV or PDV of adjacent blocks. The method of obtaining the disparity vector is identical to that in the second method.

The present application contains subject matter related to Korean patent application No. 2005-0064992, filed with the Korean Intellectual Property Office on Jul. 18, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method of decoding a multi-view video signal, the method comprising:
   decoding the multi-view video signal, the decoding comprising entropy-decoding, inverse-quantizing, and inverse transforming;
   generating a reference picture list of a current picture, the reference picture list being composed of a temporal reference picture list for temporal prediction and an inter-view reference picture list for inter-view prediction, the reference picture list comprising a reference picture specified based on configuration information; and
   obtaining a pixel value of a current block in the current picture using the reference picture list,
   wherein the pixel value of the current block is obtained using a first motion vector for temporal prediction or a second motion vector for inter-view prediction,
   wherein the configuration information represents a reference relation between a plurality of views,
   wherein the multi-view video signal is decoded with at least one of the first motion vector and the second motion vector depending on a viewpoint of the reference picture,
   wherein the first motion vector for temporal prediction is used to decode the multi-view video signal if the viewpoint of the reference picture is same as a viewpoint of the current picture, and
   wherein the second motion vector for inter-view prediction is used to decode the multi-view video signal if the viewpoint of the reference picture is different from the viewpoint of the current picture.

2. The method of claim 1, wherein the reference picture specified based on the configuration information corresponds to a same time of the current picture.

3. A method of encoding a multi-view video signal, the method comprising:
- providing a reference picture list of a current picture, the reference picture list comprising a temporal reference picture list for temporal prediction and an inter-view reference picture list for inter-view prediction, the inter-view reference picture list comprising a reference picture specified based on configuration information;
- generating a first motion vector for temporal prediction using the temporal reference picture list and a second motion vector for inter-view prediction using the inter-view reference picture list;
- predicting a pixel value of the current picture using the generated first motion vector and second motion vector;
- obtaining residual data of the current picture, the residual data being a difference value between an original pixel value of the current picture and the predicted pixel value of the current picture;
- transforming and quantizing the obtained residual data of the current picture; and
- entropy-encoding the generated first motion vector and second motion vector and the quantized residual data,
- wherein the configuration information represents a reference relation between a plurality of views,
- wherein the multi-view video signal is encoded with at least one of the first motion vector and the second motion vector depending on a viewpoint of the reference picture,
- wherein the first motion vector for temporal prediction is used to decode the multi-view video signal if the viewpoint of the reference picture is same as a viewpoint of the current picture, and
- wherein the second motion vector for inter-view prediction is used to decode the multi-view video signal if the viewpoint of the reference picture is different from the viewpoint of the current picture.

4. The method of claim 3, wherein the reference picture specified based on the configuration information corresponds to a same time of the current picture.

* * * * *